United States Patent [19]

Couch et al.

[11] 4,408,495
[45] Oct. 11, 1983

[54] FIBER OPTIC SYSTEM FOR MEASURING MECHANICAL MOTION OR VIBRATION OF A BODY

[75] Inventors: Robert D. Couch, New Freedom, Pa.; Bruce N. Lenderking, Glen Burnie, Md.

[73] Assignee: Westinghouse Electric Corp., Pittsburgh, Pa.

[21] Appl. No.: 308,317

[22] Filed: Oct. 2, 1981

[51] Int. Cl.³ .................... G01H 9/00; G02B 5/14
[52] U.S. Cl. ............................. 73/655; 250/227
[58] Field of Search ................. 73/653, 649, 655; 350/96.29; 250/227

[56] References Cited

U.S. PATENT DOCUMENTS

| | | | |
|---|---|---|---|
| 3,709,030 | 1/1973 | Aselman . | |
| 4,235,113 | 11/1980 | Carome | 73/655 |
| 4,238,856 | 12/1980 | Bucaro et al. | 73/655 |
| 4,358,678 | 11/1982 | Lawrence | 250/227 |

OTHER PUBLICATIONS

NASA Tech. Brief Lew-13219, "Lightweight Optics with Digital Output Fiber Optic Accelerometer".

*Primary Examiner*—Howard A. Birmiel
*Attorney, Agent, or Firm*—W. G. Sutcliff

[57] ABSTRACT

A system for monitoring vibration or mechanical motion of equipment utilizing an optical waveguide sensor coupled to the equipment. The optical waveguide sensor is formed into a coil or a sinuous path which exceeds the bend radius or critical angle for internally reflected light directed through the waveguide. Vibration or mechanical force imparted to the waveguide from the equipment being monitored further alters the bending losses in the waveguide, and this change in bending losses is used to generate a signal as a function of the vibration or mechanical force.

4 Claims, 2 Drawing Figures

FIBER OPTIC SYSTEM FOR MEASURING MECHANICAL MOTION OR VIBRATION OF A BODY

BACKGROUND OF THE INVENTION

The present invention relates to systems for monitoring and measuring vibration or mechanical motion of equipment. A sensor is mechanically coupled to the equipment, which sensor is an optical waveguide such as fiber optic cable. The light transmission characteristic of the optical waveguide is altered by the vibration or mechanical force imparted to it from the equipment to which it is coupled.

The use of fiber optic sensors for vibration monitoring or as mechanical motion detectors is set forth in U.S. Pat. No. 3,709,030, and NASA Tech Brief LEW-13219, "Lightweight Optics With Digital Output Fiber Optic Accelerometer". Both of the above teachings utilize the concept of having a light transmissive fiber optic cable free to vibrate or move with the equipment to which it is coupled, and to use an opaque chopper or segmented light detector to sense the movement of the fiber optic cable.

A fiber optic sensor has obvious advantages permitting its introduction into hostile environments, particularly where strong electromagnetic interference is present to generate significant electrical noise levels for most electrical sensing means. A fiber optic sensor is unaffected by such interference. The fiber optic sensors used to date require precision alignment and assembly which is difficult to attain in field equipment. These prior art sensors require high intensity light surce input, which generally means short light source lifetime, which contributes to system unreliability. A vibration sensing system is required to be on line for extended maintenance-free operation such as in a turbine or generator of an electrical power station.

It is well known that when a fiber optic cable is bent beyond a predetermined radius the light transmission characteristics of the cable are adversely affected, and this effect is termed "bending losses". The light directed through a fiber optic cable is normally internally reflected at the core-cladding boundary. When the fiber is bent beyond a critical radius, the light through the cable core strikes the core-cladding boundary at an angle greater than the critical angle, and will not be totally internally reflected, but will be lost through the cladding.

SUMMARY OF THE INVENTION

The system of the present invention employs an optical waveguide sensor which is mechanically coupled to the body or equipment which is to be monitored for vibration or mechanical motion. The optical waveguide sensor is preferably an elongated fiber optic cable which is bent beyond the critical angle at which light directed through the cable core is totally internally reflected. A light source is coupled to the input end of the cable, and a light detector is coupled to the output end for determining the reduction or change in transmitted light intensity through the bent waveguide, as the waveguide bend radius changes, due to vibration or mechanical force imparted to the waveguide by the mechanical motion of the body to which the sensor is coupled. The light detector means includes means for generating an electrical signal for display or control as a function of this reduced light intensity and the vibration or mechanical motion of the body.

DESCRIPTION OF THE PREFERRED EMBODIMENT

Figure 1:
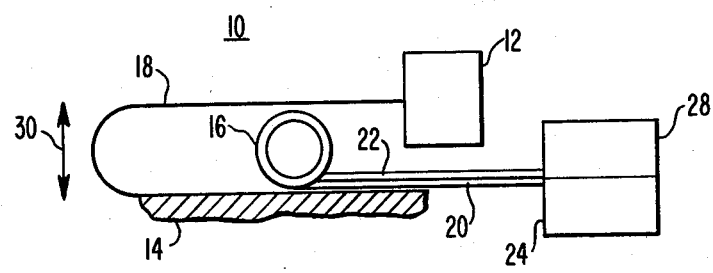
FIG. 1 is a schematic representation of an embodiment of the present invention using a coiled fiber optic cable sensor.
Figure 2:
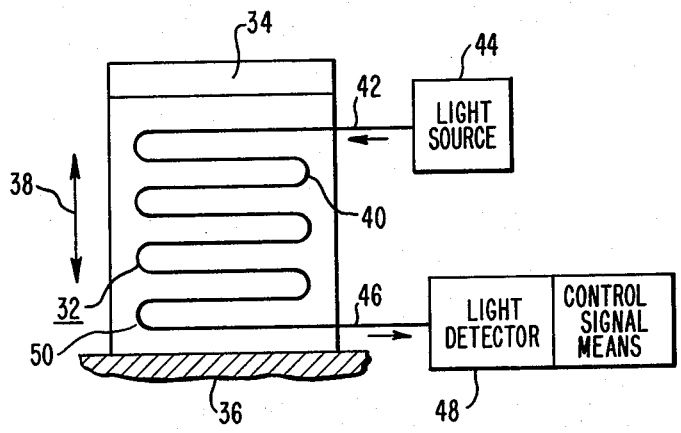
FIG. 2 is a schematic representation of another embodiment using a sinuous formed fiber optic cable.

The system of the present invention can be best understood by reference to the embodiments of FIGS. 1 and 2. The system 10 seen in FIG. 1 is adapted for use with the body or equipment 12, and a fixed surface 14, with the sensor 16 disposed between distance multiplier 18 and the fixed surface 14. The mechanical distance multiplier 18 is connected at one end to the body 12, and at the other end to fixed surface 14 has the effect of amplifying the vibration of the body 12 and applying this amplified mechanical force to the sensor 16.

The optical waveguide sensor 16 comprises a coil of fiber optic cable with a predetermined radius and number of turns. The coil has a diameter such as to fit between distance multiplier 18 and the fixed surface 14, and a radius of curvature which is greater than the bend radius at which light transmitted through the cable core strikes the core cladding boundary at an angle greater than the critical angle. By way of example the fiber optic cable may be DuPont Crofon 1610 Fiber, a trademarked material of DuPont Corporation, and the cable is wound around a 0.5 inch rubber dowel to form the sensor with three complete coil turns.

The sensor 16 includes an input cable portion 20 and an output cable portion 22. The extending end of input cable portion 20 is optically coupled to a light source 24, while the extending end of output cable 22 is optically coupled to detector 28 such as a phototransistor.

The body 12 is subjected to vibratory mechanical force along the direction indicated by line 30.

For the coiled cable sensor of Crofon 1610 Fiber, when the bend radius is changed by 0.15 inch from 0.28 inch to 0.13 inch, this reduces the light transmission through the cable core by about 33 percent for a single cable turn. So that, for changes in bend radius of about 0.015 inch, as produced by vibration, the reduction in light transmission is several percent, based on linear attenuation for changes in bend radius. By increasing the number of turns of the coiled cable one can vary the sensitivity of the sensor.

It has been observed that for a fiber optic cable, such as Crofon 1610, a DuPont trademarked fiber, wound on a 0.5 inch diameter that a linear voltage output is had for a 2 to 4 turn area on a test fixture subject to mechanical motion.

Light is transmitted from source 24 through the sensor 16 and impinges on the detector 28 which generates an output electrical signal as a function of the change in light intensity measured. When body 12 is subjected to mechanical force along line 30 with attendant vibration of body 12, mechanical force is applied to sensor 16 via mechanical distance multiplier 18. The bend radius of coiled sensor 16 is increased and light intensity transmitted through sensor 16 is reduced as a function of this change in bend radius and applied mechanical force. An output electrical signal is generated from the detector 28 to provide a control signal such as a safety warning or to effect shutdown of the operating equipment.

In another embodiment, illustrated in FIG. 2, a sensor 32 is disposed between body 34 and fixed surface 36. The body 34 is free to move or vibrate along the indicated line 38. The sensor 32 includes a sinuously formed fiber optic cable 40, with input end 42 coupled to light source 44, and output end 46 coupled to light detector 48. The sinuously formed cable 40 is disposed in a mass or block of elastic material 50 which mechanically couples the cable to the body 34 and surface 36. A plurality of 180-degree bends are formed to complete the sinuous path cable. These bends exceed the bend radius for the cable, so that vibration of body 34 will cause a reduction of light intensity through cable 40 as a function of the vibration and mechanical force on body 34.

The system of the present invention can be used to measure pressure which exerts a mechanical force upon the bent waveguide to change the bend radius and to thereby alter the light transmission through the waveguide.

What is claimed is:

1. A system for measuring the force acting on a body producing mechanical motion or vibration of the body relative to a fixed mechanical reference point, which system comprises,
   a force amplifying means connected between the fixed mechanical reference point and the body upon which the force to be measured is acting,
   an elongated fiber optic waveguide which is mechanically coupled to the force amplifying means and to the fixed mechanical reference point, which fiber optic waveguide is bent beyond the critical angle at which light directed through the waveguide is substantially totally internally reflected along the waveguide,
   a light source coupled to the input end of the fiber optic waveguide for directing light along the fiber optic waveguide,
   light detector means coupled to the output end of the fiber optic waveguide and to the light source for determining the reduction in light intensity transmitted through the bent waveguide as the waveguide bend radius changes due to the force imparted to the waveguide from the force amplifying means and including means for generating an electrical signal for display or control as a function of the reduced light intensity and of the force action on the body.

2. The system set forth in claim 1, wherein the elongated fiber optic waveguide is coiled about an axis which is normal to the direction of mechanical motion of the body.

3. A method of measuring mechanical motion or vibration of a body relative to a fixed mechanical reference point, with an elongated fiber optic waveguide mechanically coupled to the body and the fixed mechanical reference point, which fiber optic waveguide is bent beyond the critical angle at which light directed through the waveguide is substantially totally internally reflected along the waveguide, which method comprises;
   amplifying the force acting on the body,
   directing light through the bent waveguide,
   detecting the reduction in light intensity transmitted through the bent waveguide as the waveguide bend radius changes due to the mechanical force imparted to the waveguide by the mechanical motion of the body, and generating an electrical signal which is a function of this reduced light intensity and of the mechanical motion or vibration of the body.

4. A system for measuring the force acting on a body producing mechanical motion or vibration of the body relative to a fixed mechanical reference point, which system comprises,
   an elongated fiber optic waveguide formed in a sinuous path with a plurality of bends beyond the critical angle at which light directed through the waveguide is substantially totally internally reflected along the waveguide, and wherein the sinuous path waveguide is embedded within an elastic material which is disposed between the body where mechanical or vibratory motion is to be measured and the fixed reference point,
   a light source coupled to the input end of the fiber optic waveguide for directing light along the fiber optic waveguide,
   light detector means coupled to the output ends of the fiber optic waveguide and to the light source for determining the reduction in light intensity transmitted through the bent waveguide as the waveguide bend radius changed due to the force imparted to the waveguide from the body and including means for generating an electrical signal for display or control as a function of the reduced light intensity and of the force acting on the body.

* * * * *